April 24, 1973 R. E. INGHAM ET AL 3,729,368

WOOD-PLASTIC SHEET LAMINATE AND METHOD OF MAKING SAME

Filed April 21, 1971

INVENTOR
ROBERT EDWARD INGHAM
GEOFFREY WILSON DEITH

BY Abraham A. Saffitz

ATTORNEY

3,729,368
WOOD-PLASTIC SHEET LAMINATE AND METHOD OF MAKING SAME
Robert Edward Ingham and Geoffrey Wilson Deith, Harrogate, England, assignors to R. E. Ingham & Company Limited, Knaresborough, Yorkshire, England
Filed Apr. 21, 1971, Ser. No. 136,059
Int. Cl. B32b 3/00, 31/04
U.S. Cl. 161—119          10 Claims

ABSTRACT OF THE DISCLOSURE

The production of a laminate comprising a wood veneer and a sheet of plastic material through which the wood is visible. The wood surface pattern is reproduced exactly in the top surface of the plastic sheet by pressing a foil onto the plastic sheet and heating the foil to cause it to melt and flow locally of the wood pores to deform the plastic sheet onto the pattern of the wood surface. Subsequent removal of the foil reveals a surface having the appearance and feel of the bare wood.

---

The invention relates in general to laminates comprising a wood sheet or layer and a protective plastic material sheet through which the wood is visible, and in particular relates to a method of reproducing the surface pattern of the wood in the face of plastic material sheet opposite to the wood, so that such reproduced pattern lies in register with the surface pattern of the wood, and the plastic material sheet therefore has the appearance and feel of the unlaminated wood.

The reasons for applying synthetic plastic sheets to wood surfaces, such as veneer table tops, furniture, floors are well known. Whilst wood is a warm rich material making it highly desirable material for use in interior decoration, panelling or the like in domestic, industrial and other uses, it does have the disadvantage that it requires to be polished, a time consuming job if done properly, to seal the pores of the wood to render the surface of the wood waterproof and more resistant to heat and impacting than the raw wood otherwise is. Even so, polishing does not provide the complete answer because it is still possible, quite easily, to mark, score or burn a polished wood surface. The application to the wood surface however of a thin, synthetic plastic layer through which the wood remains visible provides an ideal answer to the above disadvantage, but brings with it a certain disadvantage which has up to the instant invention tended to mitigate against its more extensive use. This disadvantage is that the plastic material being smooth makes the wood appear to have a smooth unrealistic appearance.

Several methods of overcoming this difficulty by producing a simulated wood surface pattern in the face of the plastic material sheet opposite to the wood surface have already been proposed in laminates of wood veneer and plastic sheet. In one known method, the veneer and plastics material sheet are pressed together under the action of heat, a metal plate (caul) applied to the plastic material sheet having a prepared or embossed surface which is reproduced in female form in the plastic sheet by a pressing and softening action, so that the resulting surface in the plastic material simulates pores in the wood.

In another known method, a laminate is made of a wood veneer, a sheet of synthetic plastic material in which the wood surface characteristic is to be formed, and a sheet of paper which is embosssed with a wood grain or pore pattern and which has a released charatecteristic, such as a silicone wax or resin finish, to the side which is applied to the synthetic plastic sheet. The laminate is pressed in a flat plate press and heat is applied causing the synthetic plastic material to soften and the embossed pattern of the paper to be formed thereon. The laminate is then allowed to cool or is forcibly cooled during which time the synthetic plastic layer sets hard with the paper embossed pattern formed in the surface of the plastic layer which is remote from the veneer. Because of the release characteristic of the paper, it can readily be peeled from the plastic layer exposing the surface pattern of the plastics layer.

Whilst these two known methods provide a surface characteristic in the plastics sheet which is to the touch similar to the feel of wood, the full impact of the effect is not realized, and the surface still appears to be an imitation of wood, because the surface pattern in the plastic material is neither exactly the same as the wood veneer pattern nor is it in exact register with the pattern of the wood veneer. A somewhat unrealistic effect is obtained by these methods.

An object of the present invention is to provide an improved wood-plastic laminate which will have aesthetically pleasing qualities.

A further object of the invention is to provide an improved wood-plastic laminate wherein the wooo surface characteristic is repeated in the surface of the plastic material remote from the wood surface. A still further object of the invention is to provide an improved wool, plastic laminate wherein the wood surface characteristic is repeated in the surface of the plastic material remote from the wood and such surface characteristic is in exact register with the wood surface characteristic whereby such plastic surface has the appearance and feel of the wood surface underneath.

Broadly speaking, the present invention provides a method of reproducing the surface pattern of a wood surface in the face of the plastic sheet material opposite the wood in a laminate comprising the wood surface and a synthetic plastic sheet through which the wood is visible and which can be softened by heat, said method comprising applying to the said face a foil which can be softened to a fluent state under the action of heat, pressing together the wood, plastic sheet and foil, applying heat sufficient to soften the sheet and soften even more the foil so that local flow of the foil deforms the sheet to the surface pattern of the wood whereby the surface pattern of the wood is reproduced in the plastics sheet, and allowing or causing the foil and sheet to cool and set, the foil and sheet being such that the foil can subsequently be separated from the sheet exposing surface pattern in the sheet.

Preferably, the wood surface is constituted by a wood veneer and the resultant laminate can be applied to article of furniture, panels, floors, etc., although also according to the invention the synthetic plastic sheet can be applied directly to solid timber. This veneer may be mounted on a rigid base sheet such as a sheet of hardboard, chipboard or the like, said base sheet being at the side of the veneer opposite to the plastic sheet.

The sheet is preferably a thin thermoplastics sheet of transparent or translucent vinyl plastic and the foil is preferably a thin sheet of polyethlyene which may be transparent or opaque.

The invention further residues in a laminate comprising a wood surface to which a synthetic plastic sheet through which the wood surface is visible is applied said synthetic plastics material having therein the wood surface characteristic which has been applied thereto by the method as aforesaid.

By way of explanation only, an embodiment of carrying out the invention is illustrated in the accompanying drawings. In the drawings.

Figure 1:
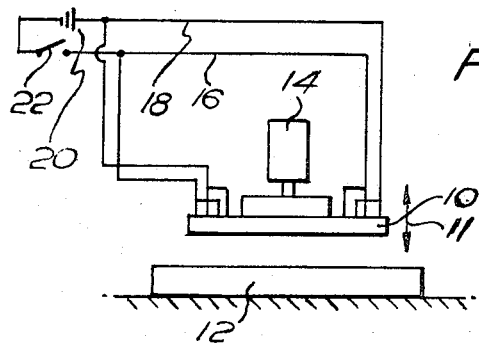
FIG. 1 is a diagrammatic illustration of a press for carrying out the process.

In the drawings, the thicknesses of the layers of the laminates are shown greatly exaggerated in the interests of clarity only.

The press for carrying out the laminating process is shown in FIG. 1 and comprises basically a flat metal press plate (caul) 10 which is movable as shown by arrow 11 towards or away from a base support 12 by means of a hydraulic ram 14. The plate 10 contains electric heating elements which are supplied with electrical power along lines 16, 18 from a source 20. A switch 22 in line 16 permits selective operation of the heaters so that the plate may be located before and/or during pressing of the laminate components. The laminate components are placed on support 12 in a suitable position to be pressed by plate 10.

Figure 2:
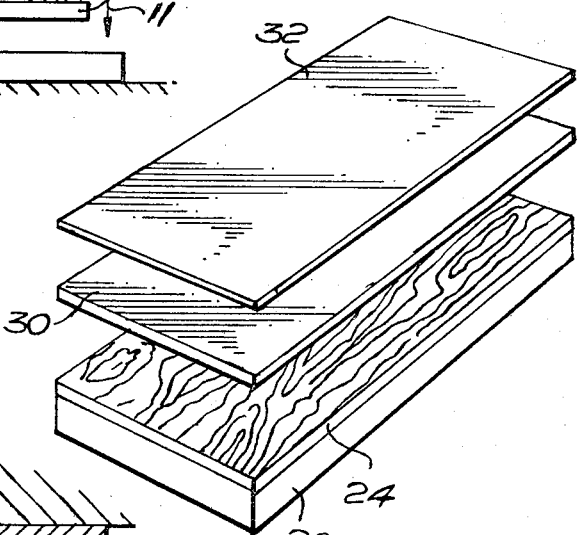
FIG. 2 illustrates in perspective and exploded view the three components of the laminate.

FIG. 2 shows the laminate components in this example. These comprise a thin wood veneer 24 which is bonded by adhesive 26 (FIGS. 3 and 4) to a base sheet 28 which may be for example of compressed paper or wood chip board, or fibre board or any other suitable base sheet material to give rigidity to the wood veneer 24. Over the veneer 24 is placed a sheet 30 of vinyl plastic material which is actual fact is of a white satin finish before it is pressed to the veneer 24 but after pressing, the wood becomes clearly visible therethrough. This satin finish is imparted to the vinyl by calender rolls during the manufacture of the vinyl. Over the vinyl layer is placed a sheet of high density polythene foil 32.

The vinyl 30 and foil 32 are chosen so that the foil softens more than the vinyl during the pressing operation when heat is applied to the laminate.

Figure 3:
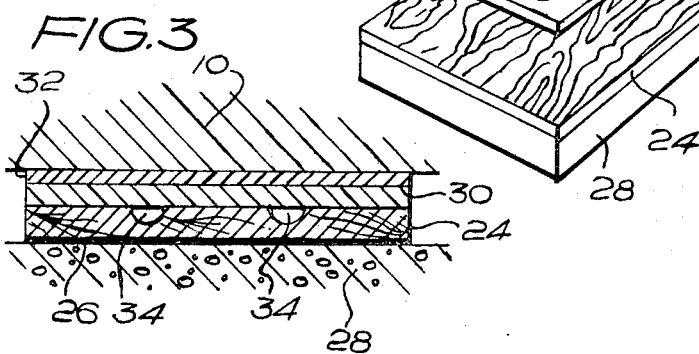
FIGS. 3 and 4 show in cross-sectional view and in detail, the components of the laminate before and after pressing.
Figure 4:
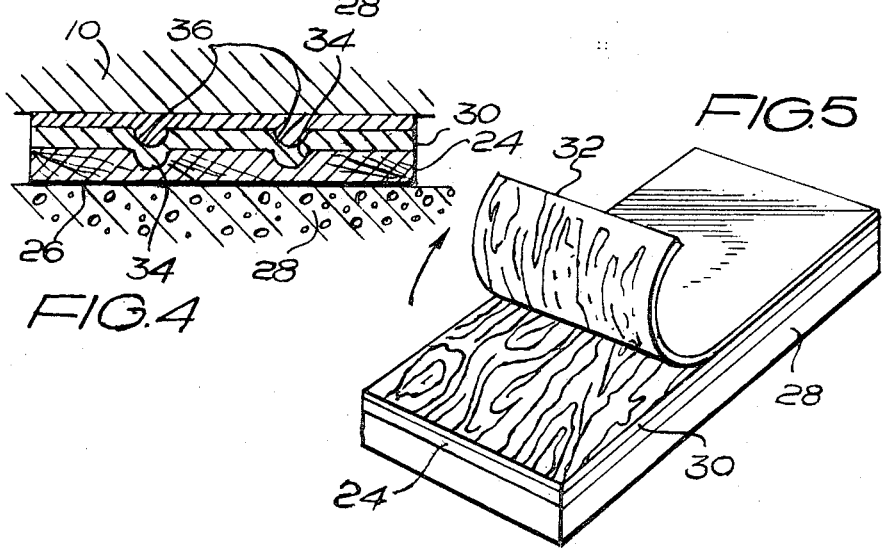

FIGS. 3 and 4 show the steps which take place during pressing and heating. In FIG. 3 the laminate is under pressure and heat but as yet the foil 32 and vinyl 30 have not begun to soften. As the heat takes effect however, the foil 32 and vinyl 30 being to soften, the foil 32 more than the vinyl, so that the foil flows locally in the region of the pores on depressions 34 in the wood veneer due to the lack of rear support at such depressions or pores for the vinyl, with the result that the vinyl, now soft enough to be deformed, is depressed into the pores of depressions 34 whilst fluent polyethylene causes the formation of, and fiills, pockets 36 in the surface of the vinyl opposite the wood veneer 24. The top surface of the foil 32 remains smooth as a smooth metal plate 10 is used in the press. There is no call for using an embossed plate 10 because the foil 32 is eventually removed from the laminate and discarded or reclaimed for further use.

After the FIG. 4 stage has been reached, the laminate is cooled or allowed to cool either in or out of the press so that the vinyl and foil set in the deformed configuration.

Figure 5:
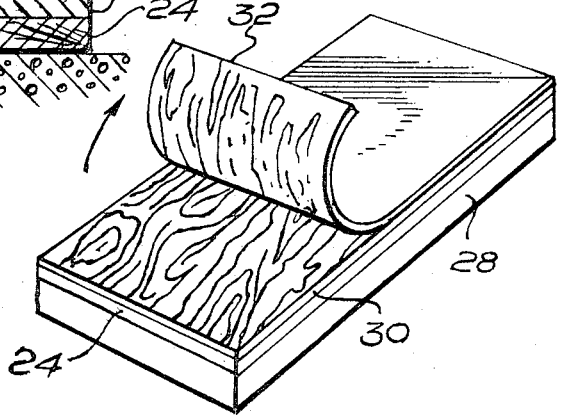
FIG. 5 shows the finished laminate with the foil partly removed.

The polyethylene and vinyl should be such that they can be separated readily, for example shown in FIG. 5 to enable the top surface of the vinyl to be exposed.

This release facility may be achieved by appropriate selection of the materials of the foil and vinyl i.e. by selecting two materials which do not adhere or chemically react when softened under heat, or it may be achieved by providing an inert flexible barrier layer between the foil and vinyl.

Upon exposing the top surface of the vinyl it is observed that there is formed thereon, the exact replica of the surface pattern of the wood veneer and the effect is extremely realistic as the said replica is, by the process of the invention, an exact register with the wood pattern. Moreover the vinyl patterned surface has the same feel as the wood adding to the realism of the effect.

The vinyl 30 adheres firmly to the wood veneer 24 because of the fibrous, porous nature of the wood, although if desired additional laying of the wood veneer 24 and vinyl 30 may be achieved for example by adhesive of a thermoplastic nature.

Whilst it is desirable that the polythene foil should be transparent, it is not necessary that this should be so. Moreover the vinyl patterned surface has the same feel as polystyrene, acrylonitrile-butadiene-styrene, cellulose acetate and polypropylene, or even various types of waxes. It may be desirable, particularly in the case of waxes, for the foil to be applied in the form of a coating to a carrier sheet such as a sheet of paper or other material; this enables the foil to be handled easier. The foil which is used in practice will depend upon the material of the plastic sheet. The foil should be capable of being readily separated from the plastic sheet and from a practical point of view, the softening or melting temperature of the foil should be less than that of the plastic sheet.

The plastic sheet need not necessarily be vinyl; it could be of another thermoplastic material such as polyvinyl fluoride, or polyethylene or it could also be of a material which is partially thermosetting, such as an acrylic sheet or partially cured polyester, the main criteria being that the plastic is softenable by heat and that it can be supplied in sheet form.

In the example of the invention described with reference to the drawings good results have been obtained by using a press pressure of 70 to 100 lbs./sq. in. when heat is simultaneously applied until the temperature is raised to 140° C. The pack of layers is held at this temperature for 10 minutes before the pack is cooled or allowed to cool, and the plastic sheet and foil set.

The vinyl was 0.006" thick whilst the polythene was 0.002" thick and good penetration of the vinyl into the wood was obtained. The thicknesses of the sheet and foil may of course be other than these dimensions depending upon the wood to which the vinyl is applied.

After cooling the polythene sheet can be readily peeled off at any time. It may be preferable in some cases to leave this polythene sheet on the laminate for protection purposes, for example, during transportation, the polythene being removed when desired.

We claim:

1. A method of reproducing the surface pattern of a wood surface in the face of the plastic sheet material opposite the wood surface in a laminate comprising the wood surface and a heat softenable synthetic plastic sheet through which the wood is visible, said method comprising the steps of:
   applying to the said face a heat softenable plastic foil;
   softening the plastic foil and sheet by heating;
   re-creating the said surface pattern in the plastics sheet by pressing together the wood, plastic sheet and plastic foil while the said plastic sheet and plastic foil are still soft;
   removing the heating and continuing to hold the wood, plastic sheet and plastic foil together while the plastic sheet and plastic foil solidify; and
   separating the plastic foil from the plastic sheet exposing said surface pattern in the plastic sheet.

2. A method according to claim 1, wherein the wood is constituted by a wood veneer.

3. A method as claimed in claim 2, wherein the wood veneer is a laminate formed of a surface veneer layer and a rigid base sheet selected from the group consisting of compressed paper board and compressed wood chip board, said base sheet being located at the side of the veneer surface layer opposite to the side to which the plastic sheet is applied.

4. A method according to claim 1, wherein the plastic sheet is taken from the group consisting of thermoplastic vinyl, polyvinyl fluoride and polyethylene and the plastic foil is taken from the group consisting of polythene, polystyrene, cellulose acetate and polypropylene.

5. A method according to claim 4 wherein the plastic sheet is 0.006" thick and the plastic foil is 0.002" thick.

6. A method according to claim 5, wherein the wood, plastic sheet and plastic foil are pressed together with a pressure of 70 to 100 lbs./in.

7. A method according to claim 6 wherein the wood, plastic sheet and plastic foil are heated to 140° C. for ten minutes whilst being pressed together.

8. A wood-plastic sheet laminate comprising means defining a wood surface, a synthetic plastic sheet which is laminated to said wood surface and through which the wood surface is visible, and a plastic foil laminated to said plastic sheet at the side opposite to said wood surface, said plastic foil having deformations defining recesses in said side of the plastic sheet, such recesses being in register with the grain pattern of the wood surface, and said plastic foil being capable of removal from said plastic sheet to expose said recreated wood pattern.

9. A composite wood-plastic sheet laminate according to claim 8 wherein the wood is constituted by a thin veneer sheet carried on a base board.

10. A composite wood-plastic sheet laminate according to claim 8, wherein the plastic sheet is vinyl.

References Cited

UNITED STATES PATENTS

| | | | |
|---|---|---|---|
| 3,518,153 | 6/1970 | Slosberg et al. | 161—DIG. 3 |
| 2,019,590 | 11/1935 | Westra | 264—220 |
| 2,046,954 | 7/1936 | La Verne et al. | 264—245 X |
| 3,674,619 | 7/1972 | Scher et al. | 161—413 X |
| 3,452,861 | 7/1969 | Erwin | 161—5 X |

PHILIP DIER, Primary Examiner

U.S. Cl. X.R.

156—209, 247; 161—138, 413, DIG. 3; 264—220, 245